United States Patent
Estes et al.

(10) Patent No.: US 10,464,234 B1
(45) Date of Patent: Nov. 5, 2019

(54) METHOD AND APPARATUS FOR CARBON DIOXIDE SEQUESTRATION

(71) Applicant: Estes-Haselbach Innovations, LLC, Charlotte, NC (US)

(72) Inventors: Christopher J. Estes, Waxhaw, NC (US); Liv M. Haselbach, Pullman, WA (US)

(73) Assignee: Estes-Haselbach Innovations, LLC, Charlotte, NC (US)

( * ) Notice: Subject to any disclaimer, the term of this patent is extended or adjusted under 35 U.S.C. 154(b) by 456 days.

(21) Appl. No.: 15/138,889

(22) Filed: Apr. 26, 2016

Related U.S. Application Data (60) Provisional application No. 62/153,251, filed on Apr. 27, 2015, provisional application No. 62/239,482, filed on Oct. 9, 2015.

(51) Int. Cl.
| | |
|---|---|
| *F01N 3/18* | (2006.01) |
| *B28C 7/04* | (2006.01) |
| *B28C 5/42* | (2006.01) |
| *B28C 7/00* | (2006.01) |
| *F01N 3/08* | (2006.01) |
| *B60P 3/16* | (2006.01) |

(52) U.S. Cl.
CPC ............... *B28C 7/04* (2013.01); *B28C 5/422* (2013.01); *B28C 5/4272* (2013.01); *B28C 7/0038* (2013.01); *F01N 3/08* (2013.01); *B60P 3/16* (2013.01)

(58) Field of Classification Search
CPC ..................................... F01N 3/08; F01N 5/00
USPC ............................................................ 366/3
See application file for complete search history.

(56) References Cited

U.S. PATENT DOCUMENTS

| | | | |
|---|---|---|---|
| 5,152,605 A * | 10/1992 | Yamada | B28C 7/0038 134/108 |
| 5,244,274 A | 9/1993 | Onodera | |
| 6,036,352 A | 3/2000 | Sakamoto | |
| 8,272,205 B2 * | 9/2012 | Estes | C04B 28/02 60/274 |
| 9,108,883 B2 | 8/2015 | Forgeron et al. | |
| 2014/0216303 A1 * | 8/2014 | Lee | C04B 22/10 106/638 |
| 2014/0373755 A1 | 12/2014 | Forgeron et al. | |
| 2015/0197447 A1 | 7/2015 | Forgeron et al. | |

FOREIGN PATENT DOCUMENTS

| | | | | |
|---|---|---|---|---|
| WO | WO-2015154174 A1 * | 10/2015 | ......... | B01D 53/1475 |

* cited by examiner

*Primary Examiner* — Tony G Soohoo
*Assistant Examiner* — Elizabeth Insler
(74) *Attorney, Agent, or Firm* — Trego, Hines & Ladenheim, PLLC (57) ABSTRACT

A concrete mixing apparatus includes: a rotatable mixing drum; an internal combustion engine including an exhaust system for discharging exhaust gas containing carbon dioxide; a diverter pipe connected in fluid communication with the exhaust system and the mixing drum; and means for cooling the exhaust gas upstream of the mixing drum.

9 Claims, 6 Drawing Sheets

METHOD AND APPARATUS FOR CARBON DIOXIDE SEQUESTRATION

BACKGROUND OF THE INVENTION

This invention relates generally to carbon dioxide ("$CO_2$") sequestration and more particularly to apparatus and method for carbon dioxide sequestration using a mobile concrete mixing apparatus.

Anthropogenic carbon dioxide is being viewed as a pollutant with respect to its contribution to the levels of greenhouse gases in the atmosphere. There are many anthropogenic sources of carbon dioxide including the burning of carbonaceous fuels and the manufacture of cementitious materials containing calcium oxide using materials containing calcium carbonate as the raw material.

It is known that carbon dioxide may be sequestered by mixing carbon dioxide with a concrete premix. The carbon dioxide chemically reacts with the calcium oxide or calcium hydroxide phases in the concrete and forms calcium carbonate. For example, U.S. Pat. No. 8,272,205 to Estes et al. describes a method for sequestering carbon dioxide in a concrete mixing truck.

It is also known that the hardening or curing of cement-containing materials can be accelerated by carbonation in which calcium hydroxide in the cement is transformed into calcium carbonate by absorbing carbon dioxide.

The exhaust gas temperature of internal combustion engines can reach high temperatures, for example about 600° C. (1100° F.). Mixing gas at such high temperatures could lead to concrete curing faster than desired. While the process described in the '205 Patent mentioned above is effective to sequester carbon dioxide, it does not specifically provide for control of the curing rate of the concrete.

Accordingly, there remains a need for an apparatus and method for sequestration of carbon dioxide in a mobile concrete mixing apparatus while controlling the curing rate of the concrete.

BRIEF SUMMARY OF THE INVENTION

This need is addressed by a concrete mixing apparatus having a carbon dioxide mixing system and also a thermal control system.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
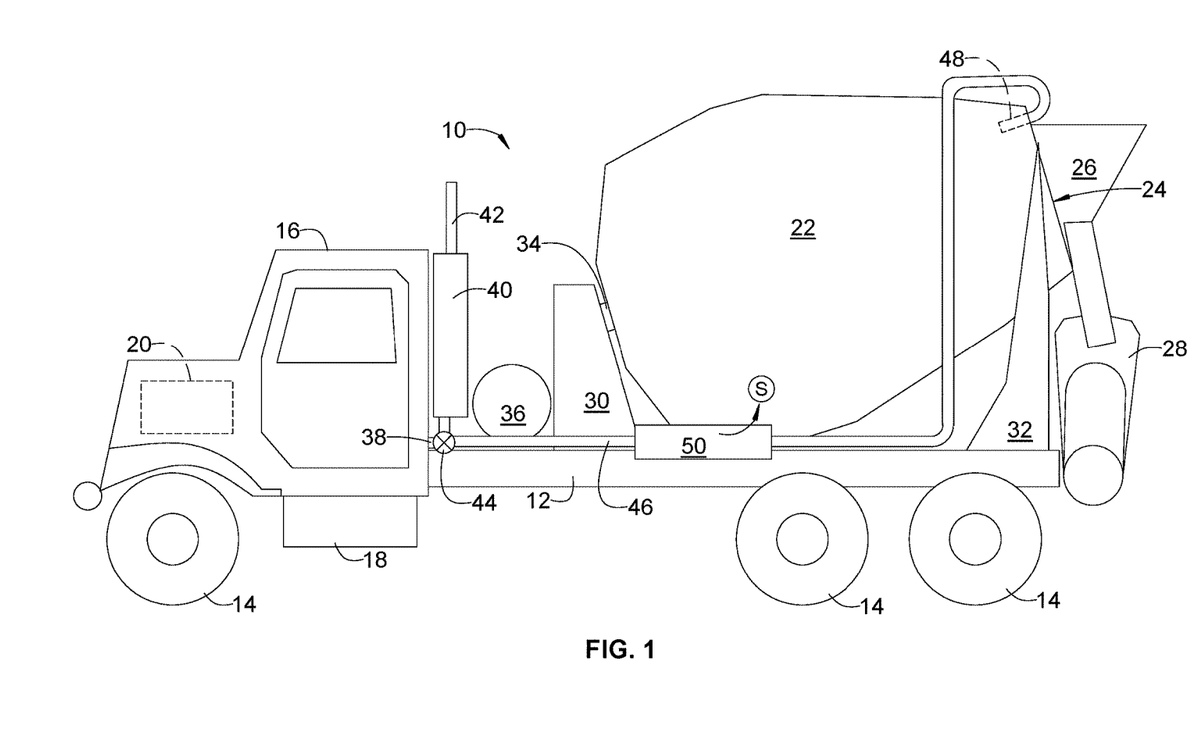
FIG. 1 is schematic side view of a concrete truck incorporating a carbon dioxide sequestration apparatus constructed according to an aspect of the present invention.

Referring to the drawings wherein identical reference numerals denote the same elements throughout the various views, FIG. 1 shows an exemplary concrete truck 10 having a chassis 12 with wheels 14, a cab 16, a fuel tank 18, and a heat engine 20 (shown schematically) which is operably connected to drive the wheels 14 in a known manner. For purposes of the present invention, the heat engine 20 may be of any type that burns a carbonaceous fuel and produces exhaust gas containing carbon dioxide. In practical application, internal combustion engines operating on the Otto or Diesel cycles would be the most common.

The concrete truck 10 includes a mixing drum 22 mounted on the chassis 12. The mixing drum 22 includes front and rear ends 23 and 24 respectively. The rear end 24 of the mixing drum 22 is open to permit loading of a premixture of fresh concrete ingredients and unloading of mixed concrete. A discharge funnel 26 and discharge chute 28 communicate with the rear end 24. The mixing drum 22 is mounted by front and rear drum supports 30 and 32, respectively, and a drum motor 34 is provided to rotate the mixing drum 22 and thereby mix the concrete premix therein using internal paddles or agitators (not shown) which are part of the mixing drum's structure. The concrete truck 10 also includes a water tank 36 for storing water that may be added to the concrete mix and/or to clean the mixing drum 22 after the concrete load is discharged.

The heat engine 20 includes an exhaust pipe 38 which discharges exhaust gas containing products of combustion including carbon dioxide. The exhaust pipe 38 is part of an overall exhaust system that may include one or more manifolds, pipes, mufflers, resonators, and/or pollution-reduction devices such as catalytic converters, particle traps, etc. (not shown). In the illustrated example, the exhaust pipe 38 is shown coupled to a muffler 40 and an exhaust stack 42. The exhaust gases are diverted from the exhaust pipe 38 to the mixing drum 22. Preferably they are diverted downstream of any pollution-reduction devices. In the illustrated example, a diverter valve 44 is coupled to the exhaust pipe 38 and a diverter pipe 46. The diverter valve 44 permits exhaust gas to be directed to the muffler 40, the diverter pipe 46, or both in any desired proportion.

The diverter pipe 46 has a discharge portion 48 which is positioned in the mixing drum 22 so that the diverted exhaust gas will contact and mix with the fresh concrete ingredients, allowing for the carbon dioxide in the exhaust gas to be sequestered in the concrete by the process of carbonation. More specifically, the carbon dioxide would be physically entrained in the concrete premix. Cementitious materials in the fresh concrete which contain calcium oxide or calcium hydroxide would then chemically react to form calcium carbonate, a solid which may permanently sequester carbon dioxide within the solid concrete matrix.

While described in the context of the concrete truck 10, it will be understood that the principles of the present invention are applicable to any concrete mixing apparatus including a heat engine that burns a carbonaceous fuel and produces exhaust gas containing carbon dioxide. For example, the illustrated concrete truck 10 is of the "rear discharge" configuration, but the present invention could be implemented in a "front discharge" concrete truck as well. As another example, the invention could also be implemented in a "towable" concrete mixer comprising a mixing drum mounted on a trailer and powered by a portable gasoline engine.

It is known that the cure rate of concrete is related to its temperature, with higher temperatures increasing the cure rate and lower temperatures lowering the cure rate. It is further known that the exhaust gas temperature of internal combustion engines can reach high temperatures, for example about 600° C. (1100° F.). Depending on the ambient temperature and the temperature of the premixture, introducing hot exhaust gas could cause the concrete to cure faster than desired.

With this in mind, the present invention provides means to remove heat from the exhaust gas and lower its temperature before delivering it to the mixing drum 22.

Figure 2:
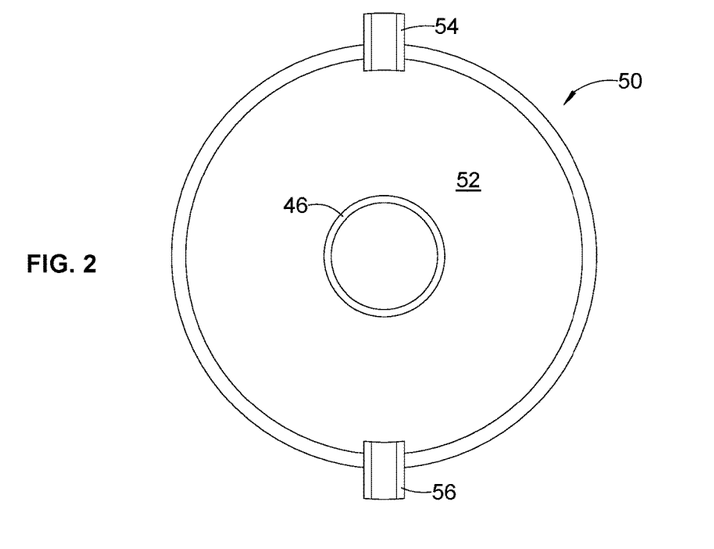
FIG. 2 is a schematic cross-sectional view of the internal construction of a heat exchanger.

FIG. 1 shows schematically a heat exchanger 50 with the diverter pipe 46 running through it. The heat exchanger 50 is thermally coupled to the diverter pipe 46 and to an appropriate heat sink, such as a cooling fluid (shown schematically at "S"). The heat exchanger 50 includes a first flowpath for the exhaust gas and a second flowpath for a cooling fluid. Cooling fluids could include air or other gases, and/or water or other liquids. Numerous physical configurations of heat exchangers are well known. For example, FIG. 2 shows a cross-sectional view of a heat exchanger 50 with the diverter pipe 46 therein defining an annular space or "water jacket" 52. Inlet and outlet fittings 54 and 56 permit relatively cool cooling fluid to be introduced into the water jacket 52 and evacuated after absorbing heat from the diverter pipe 46.

Figure 3:
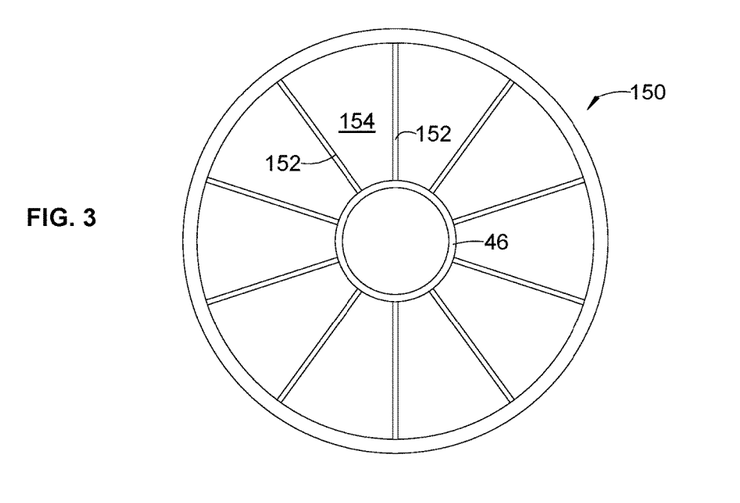
FIG. 3 is a schematic cross-sectional view of the internal construction of an alternative heat exchanger.

As another example, FIG. 3 shows a cross-sectional view of a heat exchanger 150 with the diverter pipe 46 therein, with an array of cooling fins 152 spanning the gap therebetween. In operation, relatively cool air may be introduced into the spaces 154 between the cooling fins 152, and exhausted after absorbing heat from the diverter pipe 46.

Figure 4:
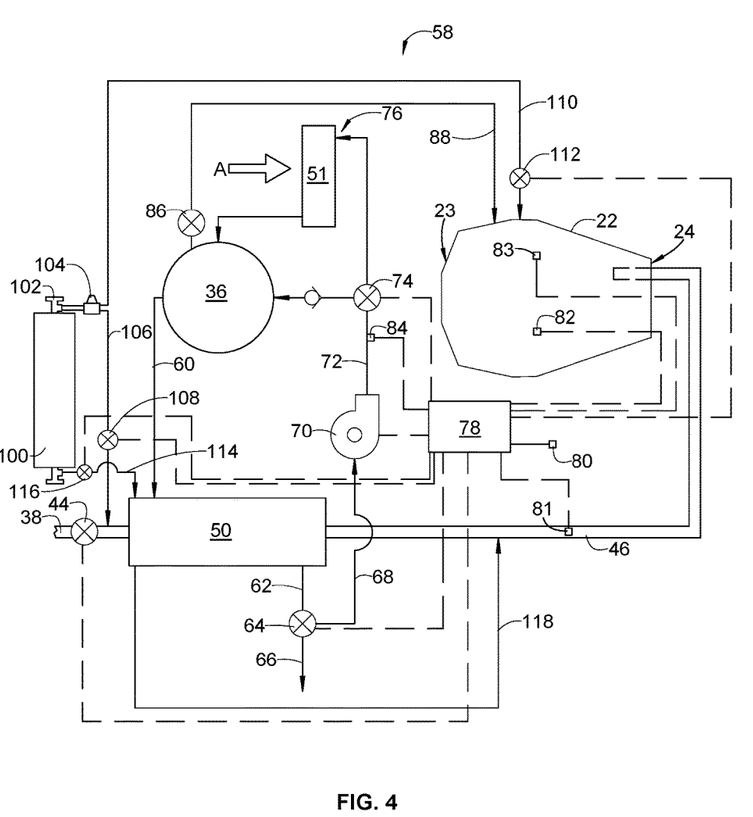
FIG. 4 is a schematic diagram of a thermal control system.

To provide additional control and flexibility, the heat exchanger 50 may be incorporated into a larger thermal control system. FIG. 4 shows an example of a thermal control system 58. The diverter pipe 46 is shown running through the heat exchanger 50 and into the mixing drum 22. The water tank 36 described above is connected to the heat exchanger 50 by an inlet pipe 60. An outlet pipe 62 is connected to the heat exchanger 50 and to a recirculation valve 64 which permits water leaving the heat exchanger 50 to be directed either to an overboard pipe 66 or to a pump inlet pipe 68 which is coupled to the inlet of a pump 70. The pump 70 discharges through a pump outlet pipe 72 leading to a cooling valve 74. The cooling valve 74 permits water leaving the pump 70 to be directed either back to the water tank 36, or to a cooling loop 76 incorporating a secondary heat exchanger 51. The secondary heat exchanger 51 may be a liquid-to-air heat exchanger which rejects heat to an external airflow "A".

The thermal control system 58 may be provided with an electronic controller 78. Any device capable of executing a programmed instruction set to control the operation of the thermal control system 58 may be used. Nonlimiting examples of suitable controllers include a programmable logic controller ("PLC"), an application-specific integrated circuit ("ASIC"), or a conventional microcomputer (sometimes referred to as a personal computer or "PC"). The controller 78 may be operably connected to one or more sensors, for example an ambient air temperature sensor 80, a gas property sensor 81 positioned in the diverter pipe 46 (e.g. pressure, temperature, and/or chemical composition), a concrete temperature sensor 82, a gas property sensor 83 positioned in the mixing drum 22 (e.g. pressure, temperature, and/or chemical composition), and/or a water temperature sensor 84. The controller 78 may be used to control the operation of the pump 70 and/or valves 44, 64, and 74. In FIG. 4, functional connections for control and/or data are shown as single dashed lines.

Various modes of operation of the thermal control system 58 are possible to provide temperature control of the exhaust gas, water, and/or concrete mix as desired.

For example, when it is desired to cool the exhaust gas prior to mixing it with the concrete, water may be provided from the water tank 36 to the heat exchanger 50 and could simply be dumped overboard from the recirculation valve 64 and overboard pipe 66, as liquid water or steam, in a total-loss cooling configuration.

Optionally, the exhaust gas may be cooled by providing water from the water tank to the heat exchanger 50, and then recirculating the water through the pump inlet pipe 68 and the pump 70 back to the water tank 36, in reliance on the thermal capacity of the water and initial low temperature to maintain its temperature and cooling effectiveness. It is noted that, depending on the configuration of the system, it may be possible to circulate the water using thermosiphon effect without need for the pump 70.

Optionally, the exhaust gas may be cooled by providing water from the water tank to the heat exchanger 50, and then recirculating the water through the pump inlet pipe 68 through the pump 70 back to the water tank 36, with the water being cooled in the secondary heat exchanger 51 before being returned to the water tank 36. This may be necessary or desirable in situations in which the ambient temperature or exhaust temperature is relatively high, for the purpose of providing adequate exhaust gas cooling and/or avoiding heating of the water in the water tank.

The degree of cooling of the exhaust gas may be varied to suit prevailing conditions. When the ambient temperature is very low, it may be desirable to heat the concrete to increase its cure rate. In such conditions, the required amount of exhaust gas cooling may be limited. In such circumstances it may also be desired to heat the water in the water tank 36. This may be done by circulating water through the heat exchanger 50 and back to the water tank 36 without passing the water through the cooling loop 76. The water may subsequently be added to the mixing drum 22 from the water tank 36 via water supply valve 86 and supply pipe 88.

In addition to or instead of the thermal control system 58 described above, the concrete truck 10 or other mobile concrete mixing apparatus may incorporate one or more features to improve mixing of the exhaust gas with the concrete in the mixing drum.

Figure 5:
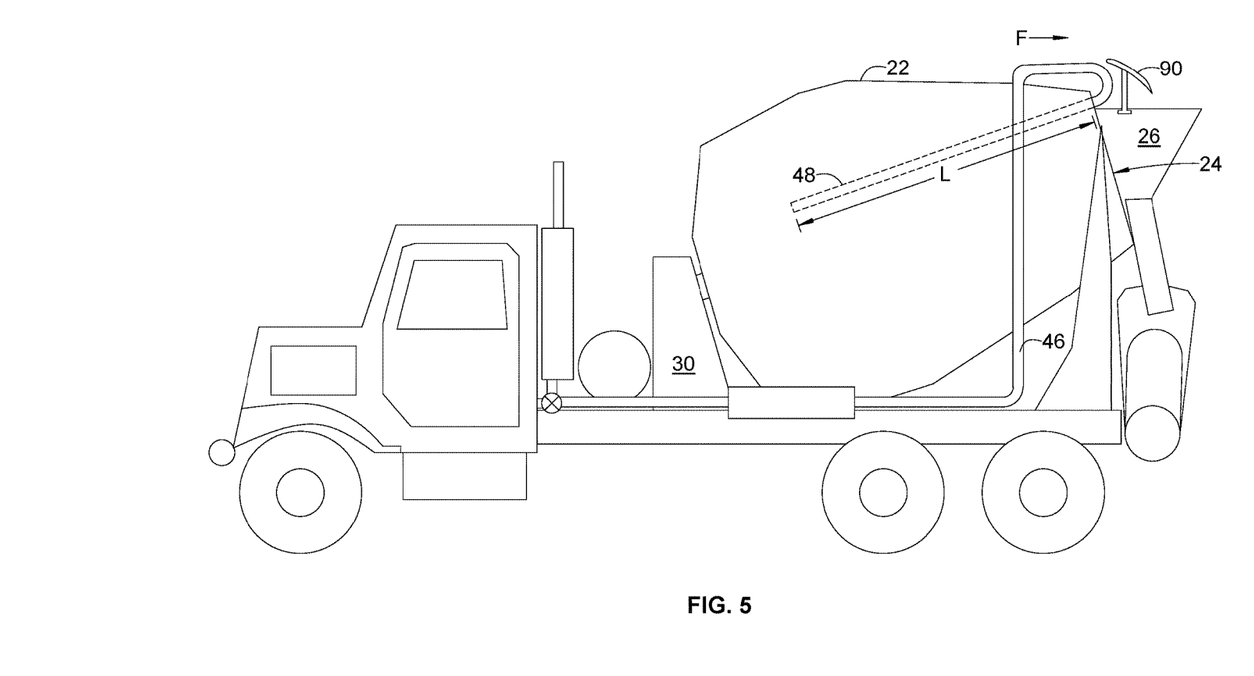
FIG. 5 is schematic side view of a concrete truck incorporating a spoiler.

For example, the length of the discharge portion 48 of the diverter pipe 46, labeled "L" in FIG. 5, may be varied to prevent ambient air from diluting the exhaust gas in the mixing drum 22 and promote mixing of the exhaust gas with the concrete premix. The exact length L may be determined experimentally. In the illustrated example, the length L is such that the discharge portion 48 extends more than half of the distance from the rear end 24 to the front end 23.

FIG. 5 also illustrates an optional spoiler 90 mounted above the discharge funnel 26 just aft of the aft end of the mixing drum 22. The spoiler 90 may be a plate-like or airfoil-like structure extending laterally and positioned to turn exterior airflow "F" across the rear end 24 of the mixing drum 22 so that ambient air does not dilute the exhaust gas in the mixing drum 22.

Figure 6:
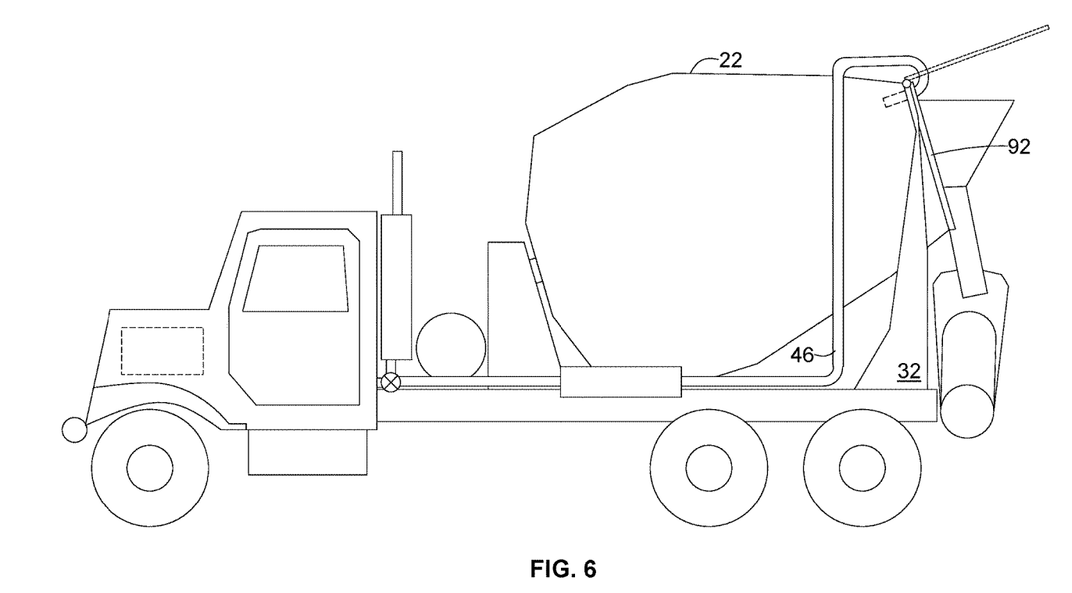
FIG. 6 is schematic side view of a concrete truck incorporating a cover.

FIG. 6 illustrates an optional cover 92 which is mounted to the aft support 32 and is moveable between a closed position (solid lines) and an open position (dashed lines). In the closed position the cover 92 lines against and closes off the rear end 24 of the mixing drum 22, so that ambient air does not dilute the exhaust gas in the mixing drum 22. In the open position the cover permits the mixing drum 22 to be loaded or unloaded. A suitable actuator (not shown) may be used to open and close the cover 92.

Figure 7:
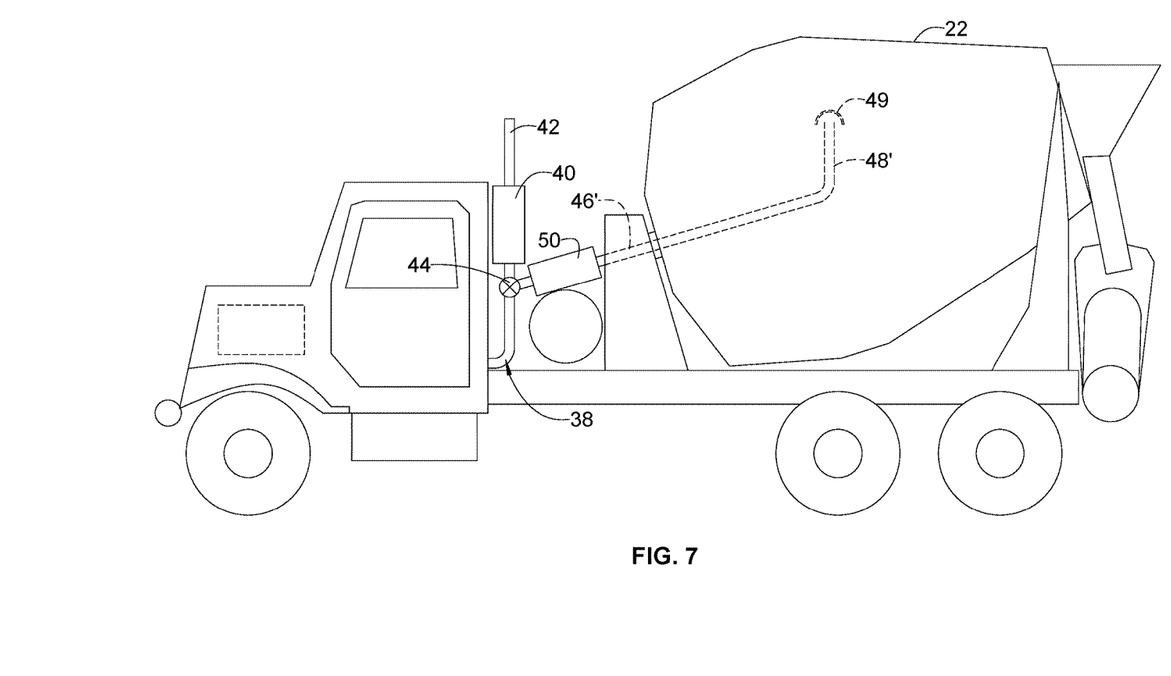
FIG. 7 is a schematic side view of a concrete truck incorporating an alternative diverter pipe.

FIG. 7 illustrates an alternative arrangement for introducing exhaust gas into the mixing drum 22. Similar to the example shown in FIG. 1, an exhaust pipe 38 is coupled to a muffler 40 and an exhaust stack 42. A diverter valve 44 is coupled to the exhaust pipe 38 and a diverter pipe 46'. The diverter valve 44 permits exhaust gas to be directed to the muffler 40, the diverter pipe 46', or both in any desired proportion. The diverter pipe 46' may pass through a heat exchanger 50 as described above. The diverter pipe 46' passes through the front drum support 30 and into the mixing drum 22, concentric with an axis of rotation of the mixing drum 22. The diverter pipe 46' has a discharge portion 48' which extends vertically (to ensure that its open end is above the level of any concrete premixture in the mixing drum 22) and terminates at a diffuser 49 which helps to spread the exhaust gases within the mixing drum 22.

A standard load of concrete contained in a typical-size mixing drum 22 can accept significantly more carbon dioxide than is produced by the heat engine 20. In order to take advantage of this property, the concrete truck 10 may be provided with an alternate source of carbon dioxide. Any convenient source of carbon dioxide may be used. For example, the concrete truck 10 may be provided with a fixed on-board carbon dioxide tank that is filled with carbon dioxide as needed, or one or more portable carbon dioxide tanks may be mounted to the concrete truck 10, and exchanged for fresh tanks when empty. The additional carbon dioxide may be stored in gaseous or liquid form. Carbon dioxide exists as a liquid into relatively low pressures, accordingly it is commonly stored and transported in liquid form to minimize the tank volume required. The original source of the carbon dioxide may be, for example, an industrial facility or process that generates carbon dioxide as a waste product or a byproduct. For example, power generation facilities that burn hydrocarbon fuels generate carbon dioxide in their exhaust streams. This carbon dioxide may be stored in tanks as described above.

The alternate source of carbon dioxide may be introduced to a concrete premixture by various means. Several examples will be described with reference to FIG. 4. A storage tank suitable for storing carbon dioxide is shown generally at 100. As noted above, the storage tank 100 may be a permanent fixture of the concrete truck 10, or it may be mounted so as to be readily removed and replaced. A shutoff valve 102 may be provided at the storage tank 100. A conventional pressure regulator 104 may be provided as well. Carbon dioxide (gaseous, liquid, or a mixture of phases) from the pressure regulator 104 may be routed through a line 106 to the diverter pipe 46 at a point upstream of the heat exchanger 50, and may be controlled by a valve 108. Optionally, carbon dioxide may be routed through a line 110 to the mixing drum 22, and may be controlled by a valve 112. The valves 108 and 112 may be controlled by the electronic controller 78.

Optionally, the alternate source of carbon dioxide may be used as a source of cooling fluid for the heat exchanger 50. The carbon dioxide may be used in addition to, or in place of, the water and/or air cooling described above. For example, carbon dioxide in liquid form may be routed from the storage tank 100 to the heat exchanger 50, through a line 114, controlled by a valve 116. Within the heat exchanger 50, the carbon dioxide would absorb heat from the exhaust gases passing through the diverter pipe 46 and change to gaseous form. The gaseous carbon dioxide may then be routed into the diverter pipe 46 through a line 118, or optionally routed to the atmosphere.

Optionally, the heat exchanger 50 could be eliminated, and liquid or gaseous carbon dioxide could be routed directly to the drum 22, using the line 110 and valve 112 as described above. Used in this manner, the carbon dioxide would provide both cooling and sequestration, as well as strengthening the concrete mixture.

As a further option, the diverter pipe 46 could be eliminated entirely, along with the heat exchanger 50 and the diverter valve 44. Liquid or gaseous carbon dioxide would be routed directly to the drum 22, as described above. In this situation, the exhaust gases of the heat engine 20 would not be sequestered, however there may still be a net benefit in sequestering carbon dioxide from another source, and/or in strengthening the concrete.

The electronic controller 78 may be used to receive information from the gas property sensors 81, 83 and to control the flow of diverted exhaust and/or alternate carbon dioxide as required using one or more of valves 108, 112 and 116 so as to control any aspect of the exhaust gas diversion, thermal control, and/or additional carbon dioxide mixing process, including for example maintaining a desired combination of gas properties. For example, the electronic controller 78 may be used to control the carbon dioxide concentration within the mixing drum 22. Alternatively, electronic controller 78 may be used to control the carbon dioxide concentration in the diverter pipe 46 before it enters the mixing drum 22. The electronic controller 78 may be used to start or stop the flow of exhaust gas and/or containerized carbon dioxide to the mixing drum 22, and may be used to control the ratio of exhaust gas to containerized carbon dioxide which is provided to the mixing drum 22.

The apparatus and process described above may be used to make environmentally beneficial use of the carbon dioxide in the exhaust from a concrete mixing truck or other mobile concrete mixing apparatus, permanently sequestering substantial amounts within the concrete product. It may also be used to providing temperature control of the exhaust gas, concrete premix, and/or water so as to provide effective control of the cure rate of the concrete. It may also be used to make environmentally beneficial use of carbon dioxide from a source other than vehicle exhaust.

The foregoing has described apparatus and method for carbon dioxide sequestration. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

What is claimed is:
1. A method for sequestering carbon dioxide, comprising:
  mixing a pre-mixture of primary fresh concrete ingredients in a rotatable mixing drum which is mounted to a chassis of a wheeled vehicle;
  operating an internal combustion engine so as to produce an exhaust gas containing products of combustion including carbon dioxide, wherein the internal combustion engine is configured to drive one or more wheels of the wheeled vehicle;

cooling the exhaust gas, wherein the exhaust gas is cooled by passing it through a heat exchanger which is cooled by a cooling fluid having a temperature lower than a temperature of the exhaust gas;

directing the cooled exhaust gas into the mixing drum;

introducing the exhaust gas into the pre-mixture of primary fresh concrete ingredients during the mixing process; and allowing the carbon dioxide from the exhaust gas to be physically mixed with and sequestered into a fresh concrete mixture.

2. The method of claim 1 further comprising providing additional carbon dioxide from a storage tank into the mixing drum and allowing the additional carbon dioxide to be physically mixed with and sequestered into the fresh concrete mixture.

3. The method of claim 1 wherein the cooling fluid is water.

4. The method of claim 3 wherein the water is recirculated through a cooling loop which includes a water tank, the heat exchanger, and a pump.

5. The method of claim 4 wherein the cooling loop further includes a secondary heat exchanger configured to cool the water.

6. The method of claim 1 wherein the cooling fluid is carbon dioxide.

7. The method of claim 6 wherein the carbon dioxide passes through the heat exchanger and is then mixed with the exhaust gas upstream of the mixing drum.

8. The method of claim 1 wherein the exhaust gas is cooled by mixing carbon dioxide directly into the exhaust gas upstream of the mixing drum.

9. The method of claim 1 further comprising:

using at least one sensor configured to detect at least one gas property of the diverted exhaust gas and/or of the atmosphere within the mixing drum; and using an electronic controller to control at least one aspect of the carbon dioxide sequestration method in response to information from the at least one sensor.

* * * * *